(12) United States Patent
ten Dam et al.

(10) Patent No.: US 11,401,036 B2
(45) Date of Patent: Aug. 2, 2022

(54) TITANIUM INNER SHELL FOR ELECTRICAL GALLEY INSERTS

(71) Applicant: Koninklijke Fabriek Inventum B.V., Nieuwegein (NL)

(72) Inventors: Martijn ten Dam, Amsterdam (NL); Siebe Schootstra, Culemborg (NL)

(73) Assignee: Koninklijke Fabriek Inventum B.V., Nieuwegein (NL)

(*) Notice: Subject to any disclaimer, the term of this patent is extended or adjusted under 35 U.S.C. 154(b) by 425 days.

(21) Appl. No.: 16/746,041

(22) Filed: Jan. 17, 2020

(65) Prior Publication Data

US 2021/0221513 A1 Jul. 22, 2021

(51) Int. Cl.
*B64D 11/04* (2006.01)
*F25D 23/06* (2006.01)

(52) U.S. Cl.
CPC ............ *B64D 11/04* (2013.01); *F25D 23/066* (2013.01)

(58) Field of Classification Search
None
See application file for complete search history.

(56) References Cited

U.S. PATENT DOCUMENTS

| 8,319,160 B2 | 11/2012 | Koschberg et al. |
| 9,523,506 B2 | 12/2016 | Lee |
| 9,970,661 B2 | 5/2018 | Calvin |
| 2015/0083108 A1 | 3/2015 | DeFoort et al. |
| 2016/0040890 A1 | 2/2016 | Barford |
| 2019/0313486 A1 | 10/2019 | Castillo |

FOREIGN PATENT DOCUMENTS

| GB | 2570907 A | 8/2019 |
| WO | 2005094646 A1 | 10/2005 |
| WO | 2014174228 A1 | 10/2014 |
| WO | 2015025154 A1 | 2/2015 |

OTHER PUBLICATIONS

Extended Search Report for European Application No. 21151898.0 dated May 21, 2021, 7 pages.

*Primary Examiner* — Alexander S Thomas
(74) *Attorney, Agent, or Firm* — Suiter Swantz pc llo (57) ABSTRACT

An aircraft galley insert (GAIN) device is disclosed. In embodiments, the aircraft GAIN device may be an oven or chiller, and includes an exterior housing installable in an aircraft galley structure and a forward door operable via a handle. The GAIN device includes an inner shell fashioned of a one or more sheets of titanium (e.g., Grade 1 and/or Grade 2) of optimal thickness. The inner shell contains an interior cavity within its upper, lower, left-side, and right-side surfaces, the interior cavity accessible via the forward door. The GAIN device includes a backplate fastened to the inner oven shell and defining a rear surface of the interior cavity, the backplate fashioned of a thicker sheet of titanium.

13 Claims, 8 Drawing Sheets

TITANIUM INNER SHELL FOR ELECTRICAL GALLEY INSERTS

TECHNICAL FIELD

The subject matter disclosed herein is directed generally to aircraft galley components and more particularly to aircraft oven components.

BACKGROUND

The inner components and surfaces of aircraft ovens (e.g., convection ovens, steam ovens, microwave ovens) and warmers undergo a great deal of wear and tear throughout the lifecycle of the oven. For example, the inner oven surfaces may be subject to corrosion (e.g., from salts, acids, or other meal components) and constant temperature cycling as a condition of everyday use. Further, the inner surfaces endure constant scratches, hits and other impacts, e.g., due to the constant removal and insertion of meal trays and carriers from and to the inner oven. In addition, inner ovens (e.g., fashioned of stainless steel) may be heavy and bulky components. Excess weight is never beneficial from an efficiency standpoint; similarly, any energy expended by the oven to heat its contents will first heat the inner oven itself—the bulkier the inner oven, the more time and energy is required to heat it.

SUMMARY

An aircraft galley insert (GAIN) device is disclosed. In embodiments, the aircraft GAIN device includes an exterior housing installable in an aircraft galley structure and a forward door operable via a handle. The GAIN device includes an inner shell fashioned of one or more sheets of titanium (e.g., Grade 1 and/or Grade 2) between 0.4 and 0.8 millimeters in thickness. The inner shell contains an interior cavity within its upper, lower, left-side, and right-side surfaces, the interior cavity accessible via the forward door. The GAIN device includes a backplate fastened to the inner oven shell and defining a rear surface of the interior cavity, the backplate fashioned of a thicker sheet (e.g., 0.5 to 1.2 millimeters) of titanium.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
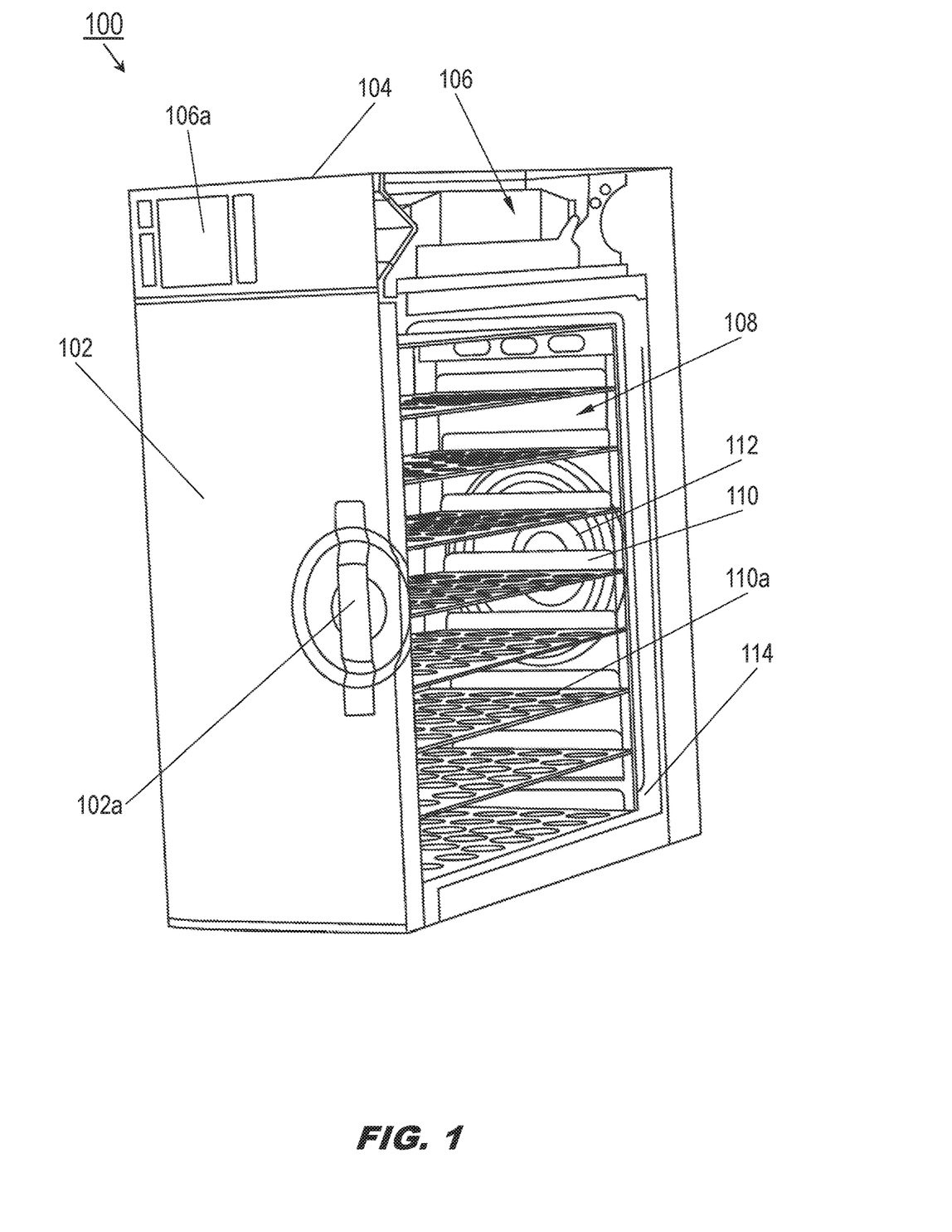
FIGS. 1 and 2 are respectively forward and rear isometric cutaway views of an aircraft galley insert (GAIN) device according to example embodiments of this disclosure.
Figure 2:
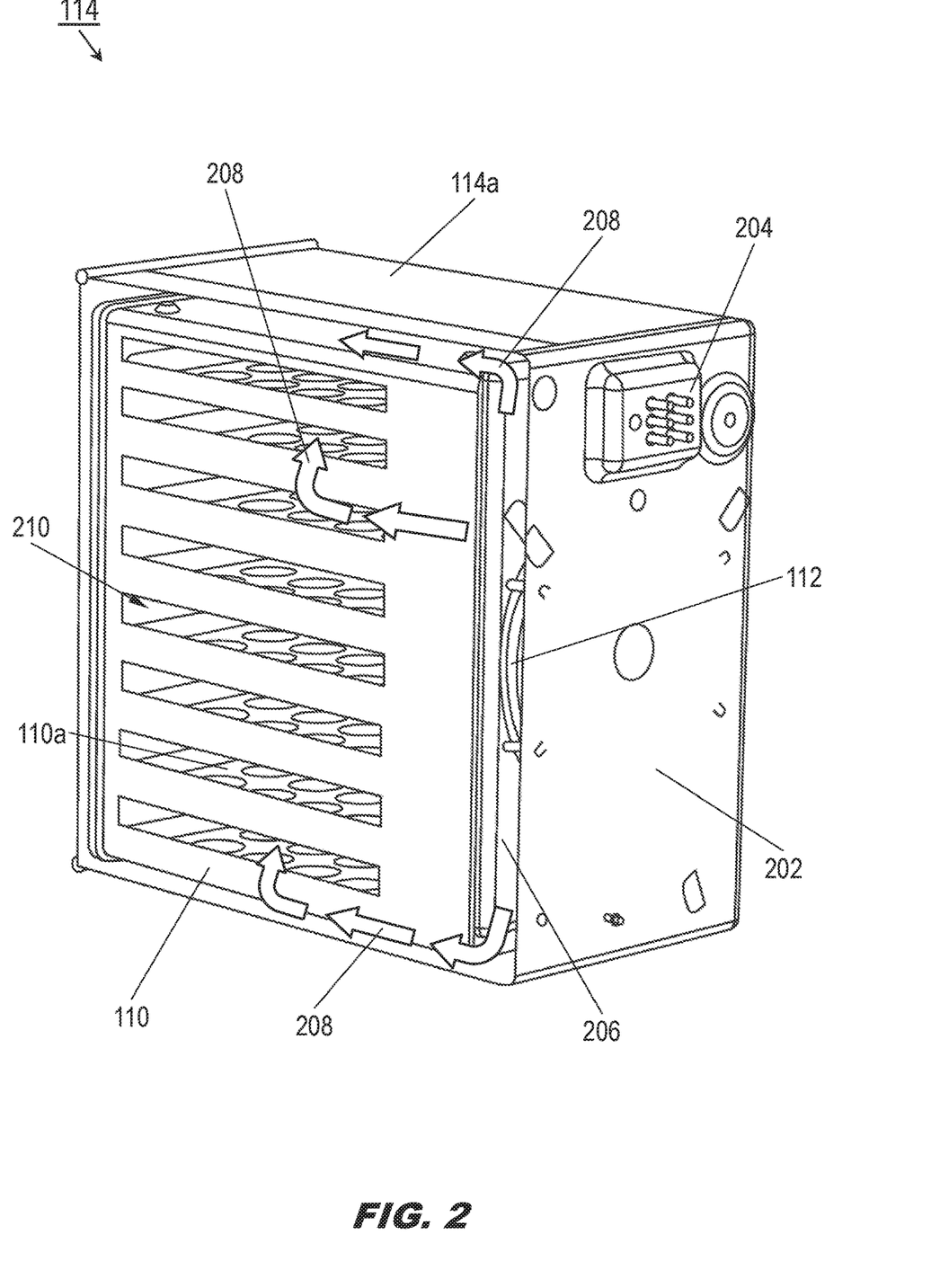
Figure 8A:
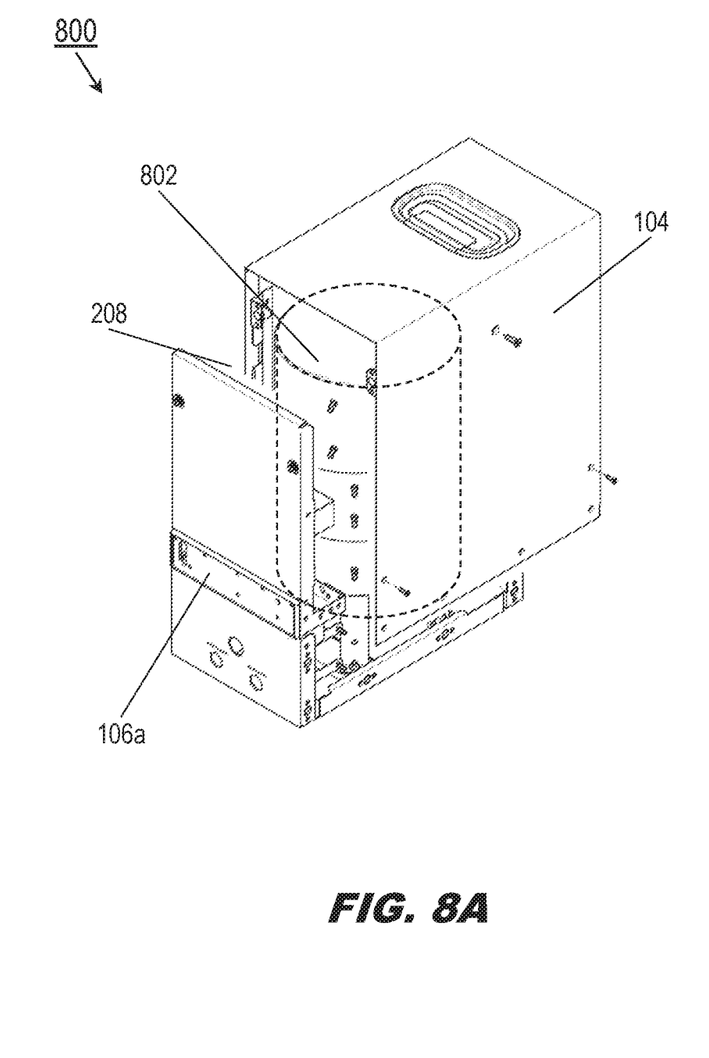
FIGS. 8A and 8B are isometric views of an aircraft GAIN water heater device according to example embodiments of this disclosure
Figure 8B:
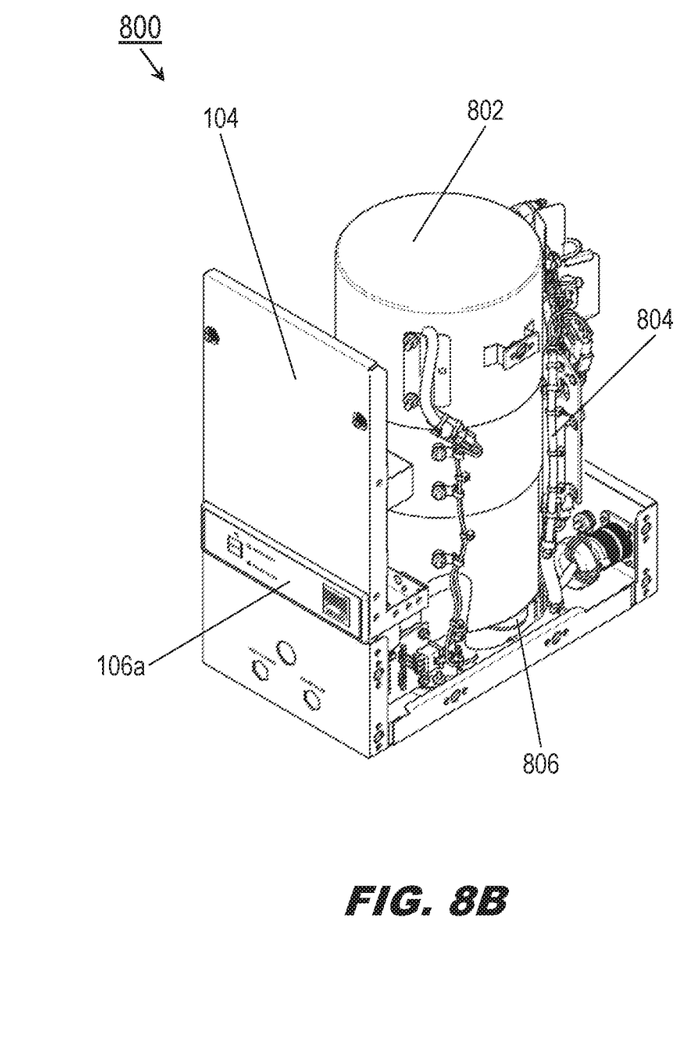

Referring generally to FIGS. 1 and 2, an aircraft galley insert (GAIN) device 100 is disclosed. In embodiments, the aircraft GAIN device 100 may include convection ovens, steam ovens, microwave ovens, and other types of ovens and warmers installable in a galley structure and compatible with a galley insert (GAIN) of standard size (e.g., ARINC size 4); chiller devices (FIG. 3); and water heaters/boilers (FIG. 8). In some embodiments, the aircraft GAIN device 100 may be a half-size oven, e.g., of like depth and width with the standard-size aircraft GAIN device 100 shown by FIGS. 1 and 2 but having a height half that of the standard-size aircraft oven (e.g., ARINC size 6). The aircraft GAIN device 100 may include a forward door 102 having a handle 102a, an external housing 104, mechanicals and control hardware 106 disposed within the external housing, an interior cavity 108 accessible via the door 102. In some embodiments, ovens and warmers may include a meal carrier 110 and a heating element 112 incorporating a fan, via which the interior cavity 108, the meal carrier 110, and its contents may be heated (e.g., convectively heated via circulating heated air).

In embodiments, the aircraft GAIN device 100 may incorporate an inner shell 114 fashioned of a thin sheet of titanium and defining the outer surfaces of the interior cavity 108. For example, the inner shell 114 may include an upper or top surface 116a, a lower or bottom surface, a left side lateral surface, and a right-side lateral surface. In embodiments, the various upper, lower, left-side lateral, and right-side lateral surfaces of the inner shell 114 may be fashioned of Grade 1 or Grade 2 commercially pure titanium of various thicknesses. In all cases, however, the use of titanium inner shell components may reduce the weight of the inner shell 114 significantly as compared to a stainless steel inner oven of like thickness (e.g., titanium being approximately 45% lighter). For example, the inner shell 114 may be fashioned of one or more sheets of Grade 1 or Grade 2 titanium having a thickness substantially between 0.4 and 0.8 millimeters, and ideally 0.5 millimeters. In some embodiments, the inner shell 114 may be fully fashioned of sheets of Grade 2 titanium, which may provide enhanced strength at higher temperatures and greater dent resistance. Further, the use of titanium as opposed to stainless steel may provide enhanced resistance to potentially corrosive meal components (e.g., salts, acids) and significantly improve the overall performance and efficiency of the aircraft GAIN device 100. For example, as the titanium inner shell 114 has less mass, the titanium inner shell may be heated to a desired target temperature significantly faster than a comparable stainless steel inner oven of comparable thickness, reducing overall cooking time and energy use.

In embodiments, cooking and/or warming operations (or, e.g., chilling operations) generally may be controlled by the control hardware 106, e.g. according to control input submitted by a user via a control panel or human-machine interface 106a (HMI) mounted to the exterior housing 104 (e.g., above the forward door 102). For example, a user may heat (via the heating element 112) or chill the interior cavity 108 (e.g., and any meal components or other products placed therein) to a desired temperature, maintain the contents at a desired temperature, or heat the contents according to a specific set of directions.

Referring in particular to FIG. 2, the inner shell 114 may include a backplate 202. In embodiments, the backplate 202 may be welded or otherwise fastened to the inner shell 114 and may fully or partially define a rear surface thereof. For example, the exterior surface of the backplate 202 may include a galley insert (GAIN) interface 204 capable of connecting the aircraft GAIN device 100 to an aircraft-based power supply via connectors built into a galley structure into which the aircraft oven is installed. Similarly, the aircraft GAIN device 100 may provide maintenance and usage data to an aircraft-based network via the GAIN interface 204. The backplate 202 may be fashioned of Grade 1 or Grade 1 titanium of similar thickness to the inner shell 114. In some embodiments, to increase strength and stability the backplate 202 may be fashioned of Grade 1 or Grade 2 titanium of generally greater thickness than the inner shell 114. For example, the backplate 202 may be fashioned of Grade 1/Grade 2 titanium having a thickness substantially between 0.5 and 1.2 millimeters, and ideally 0.8 millimeters.

In embodiments, the aircraft GAIN device 100 may include a baffle plate 206 attached to the interior surface of the backplate 202. In some embodiments, the baffle plate 206 may be attached to an interior surface of the inner shell 114 instead of, or in addition to, the backplate 202. For example, the heating element 112 may be attached to the interior surface of the backplate 202, and the baffle plate 206 bolted or otherwise fastened to the backplate such that the heating element and fan is disposed between the backplate and the baffle plate. The baffle plate 206 may facilitate the circulation of heated air (208) throughout the interior of the inner shell 114, e.g., between the interior surfaces of the inner oven shell and the meal carrier 110. For example, referring also to FIG. 1, the meal carrier 110 may include a series of shelves or trays 110a on which meal components may be placed for heating or warming. The meal carrier may include a series of apertures 210 through which the heated air 208 may pass into and through the individual shelves or trays 110a for optimal heating.

Figure 3:
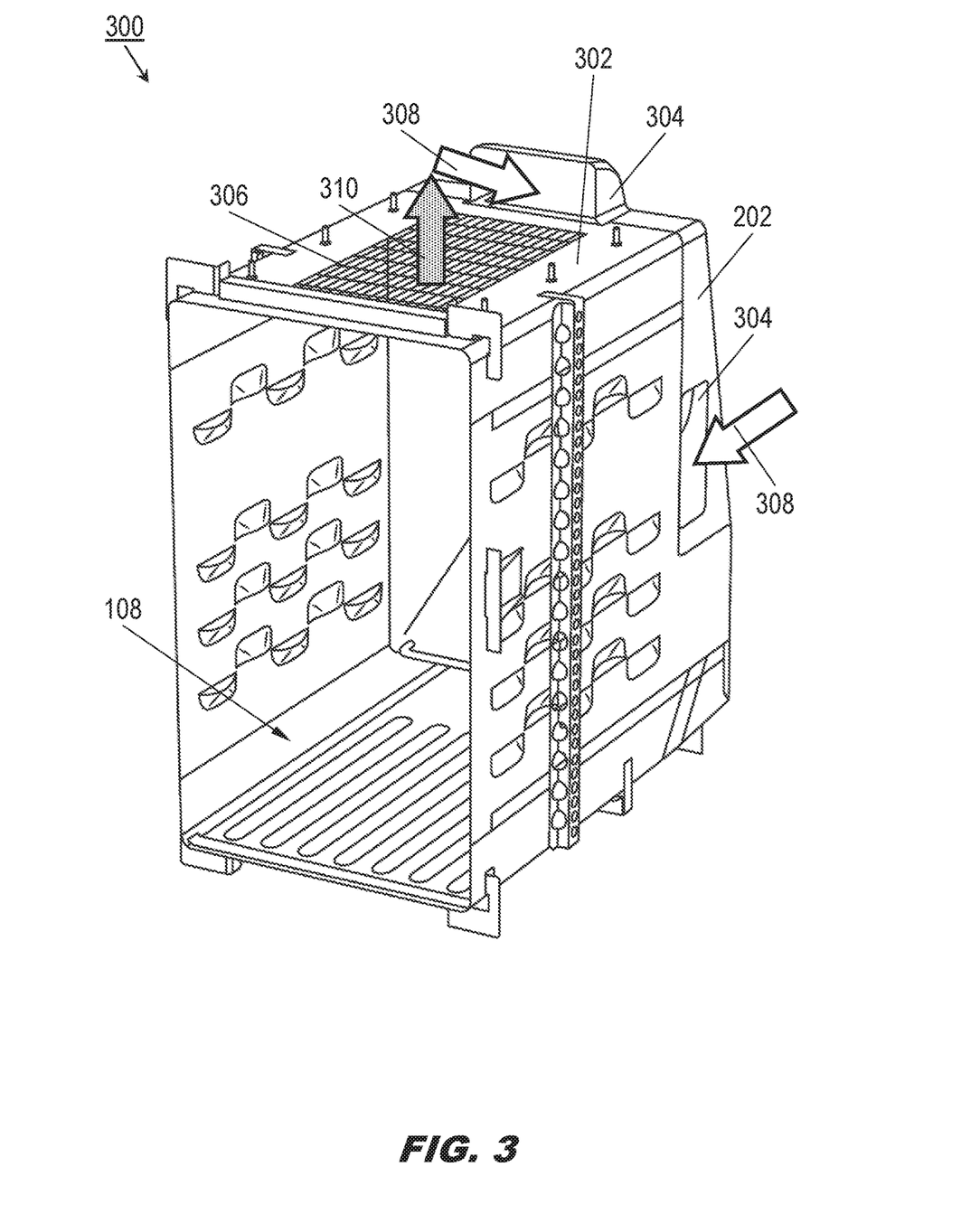
FIG. 3 is a forward isometric view of an inner shell for an aircraft GAIN chiller device according to example embodiments of this disclosure.

Referring to FIG. 3, the inner shell 300 may be implemented and may function similarly to the inner shell 114 of FIGS. 1 and 2, except that the inner shell 300 may be integrated into an aircraft GAIN device configured for chilling food, beverages, or meal components.

In embodiments, the GAIN chiller device may freeze meal components placed within the interior cavity 108 or maintain the meal components at or below a desired or required temperature (e.g., as required by food service regulations or policies). For example, rather than accommodate a heating element (112, FIG. 1) the inner shell 300 may incorporate, either within one or more surfaces of the inner shell (e.g., the upper surface 302) or within the backplate 202, air intake vents 304 and air exhaust vents 306 to allow chilled air to circulate through the inner shell, entering (308) the interior cavity 108 fully chilled and exiting (310) the interior cavity for re-chilling. In addition to the weight and corrosion resistance benefits discussed above, the inner shell 300 may compose less mass than a comparable stainless steel inner shell, and may therefore require less energy to chill to or below a desired temperature.

Figures 4A, 4B:
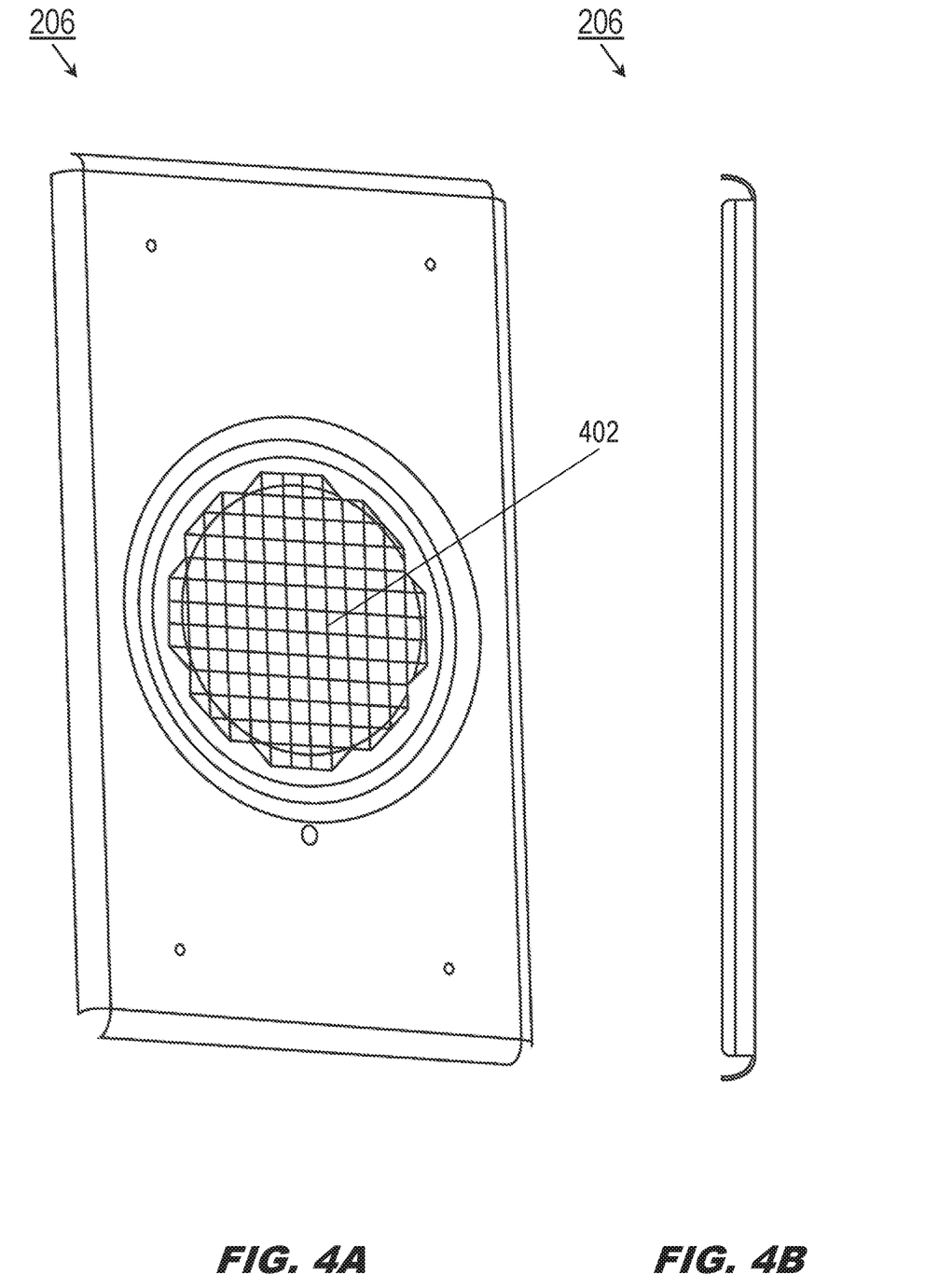
FIGS. 4A and 4B are respectively forward isometric and profile views of a baffle plate of the aircraft oven of FIGS. 1 and 2.

Referring to FIGS. 4A and 4B, the baffle plate 206 is shown.

Figure 5A:
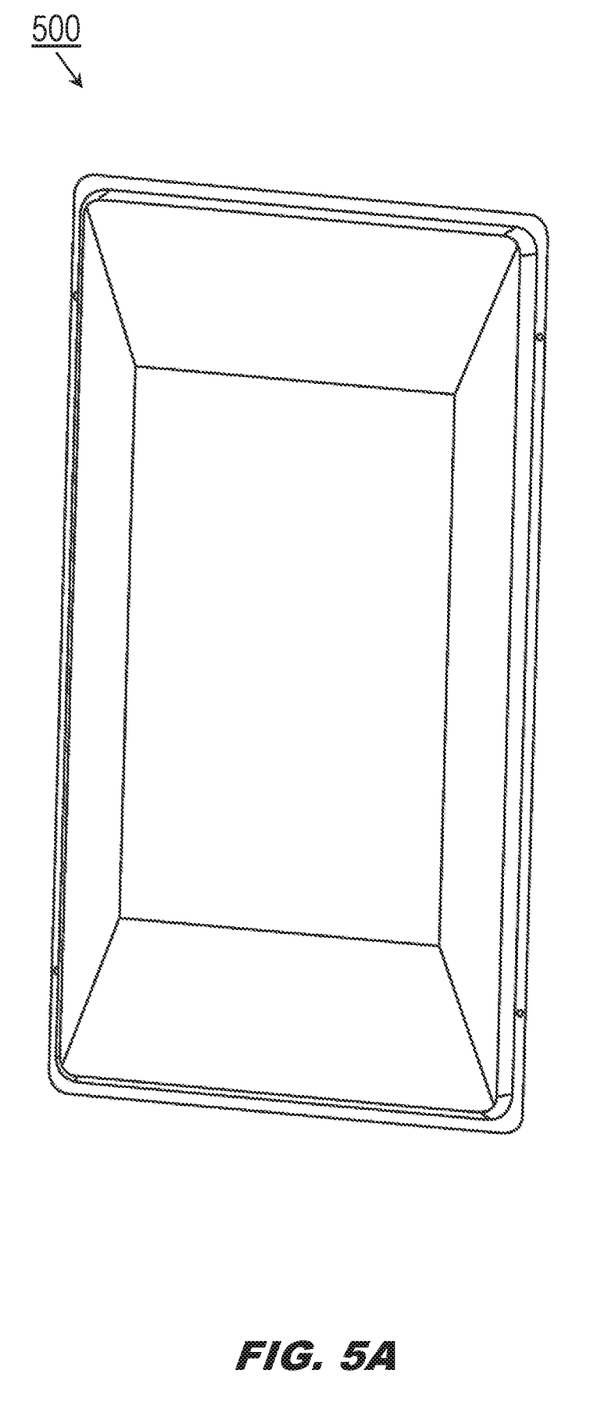
FIGS. 5A and 5B are respectively forward isometric and profile views of an inner door plate of the aircraft oven of FIGS. 1 and 2.
Figure 5B:
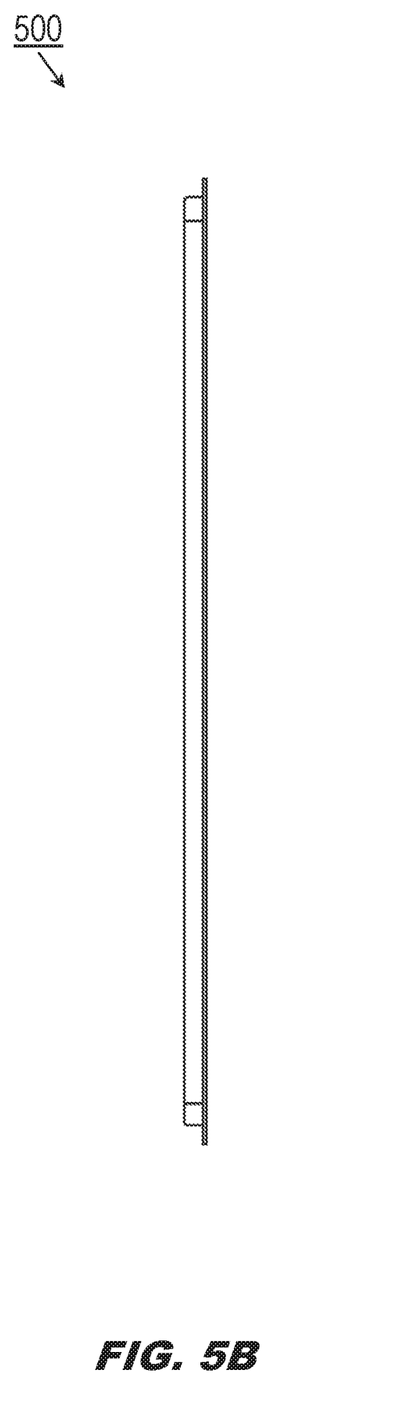

Referring to FIGS. 5A and 5B, an inner door plate 500 is shown.

Figure 6A:
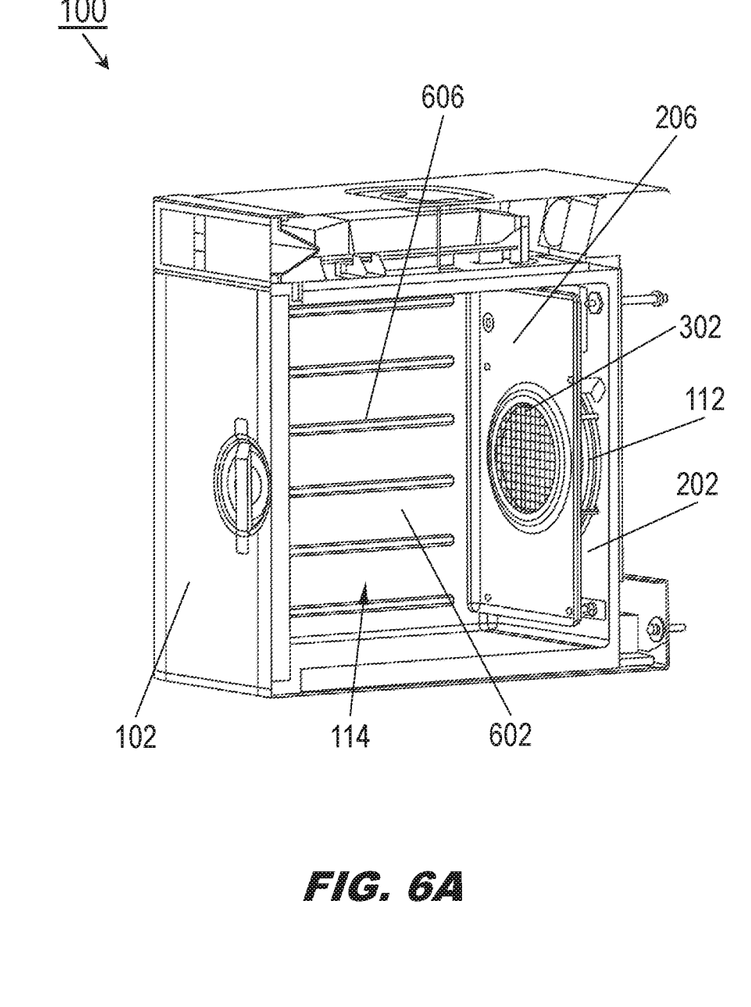
FIGS. 6A and 6B are respectively forward and rear isometric cutaway views of the aircraft oven of FIGS. 1 and 2.
Figure 6B:
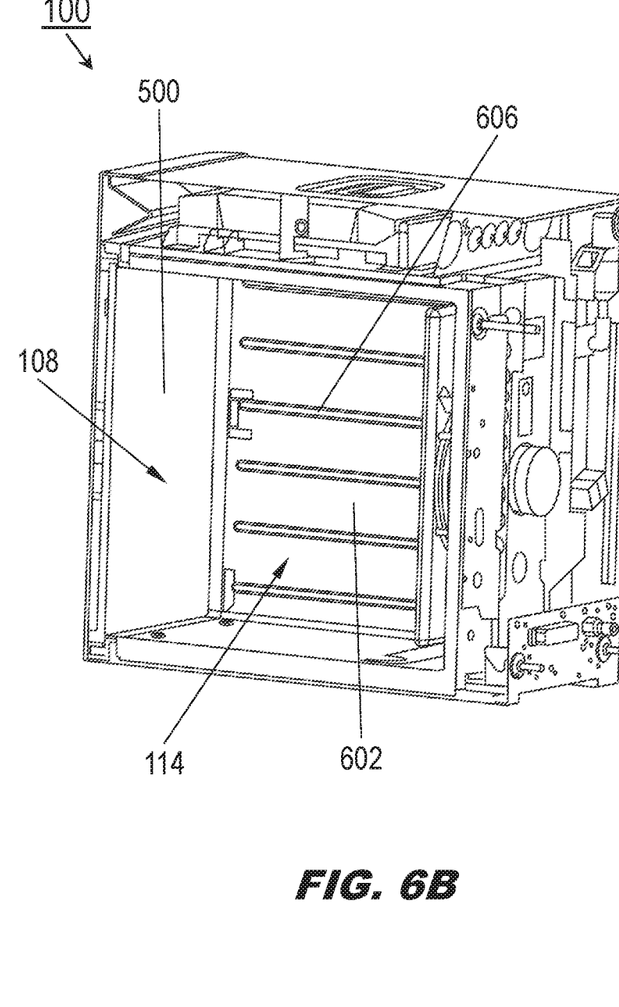

Referring to FIGS. 6A and 6B, the aircraft GAIN device 100 is shown.

Figure 7A:
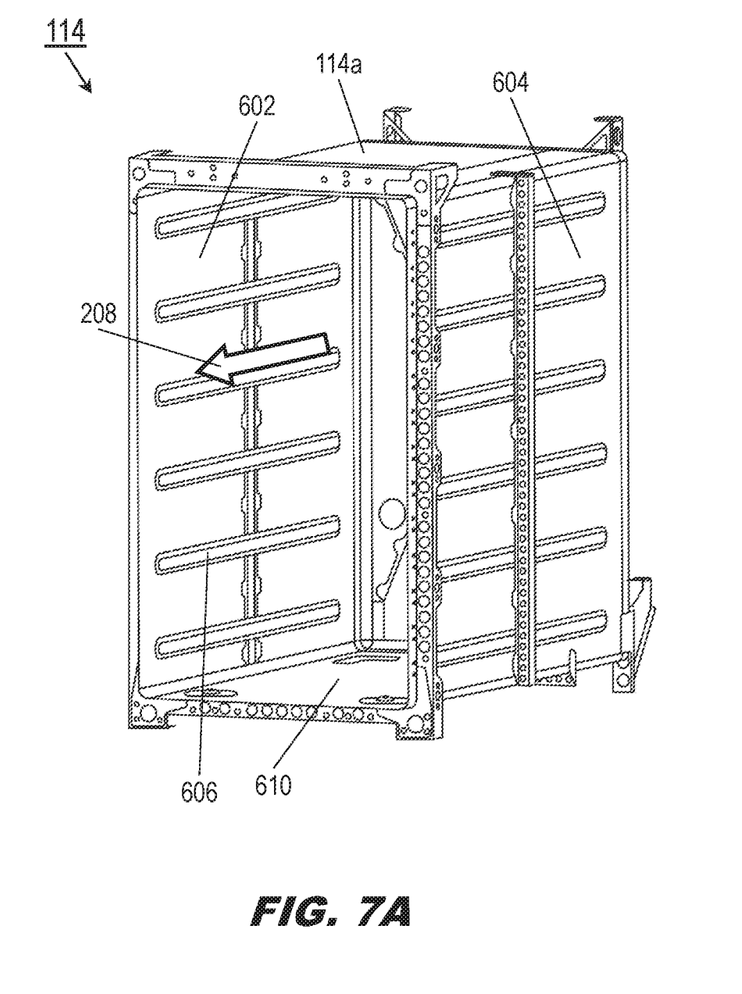
FIGS. 7A and 7B are respectively forward and rear isometric views of an inner oven assembly of the aircraft oven of FIGS. 1 and 2.
Figure 7B:
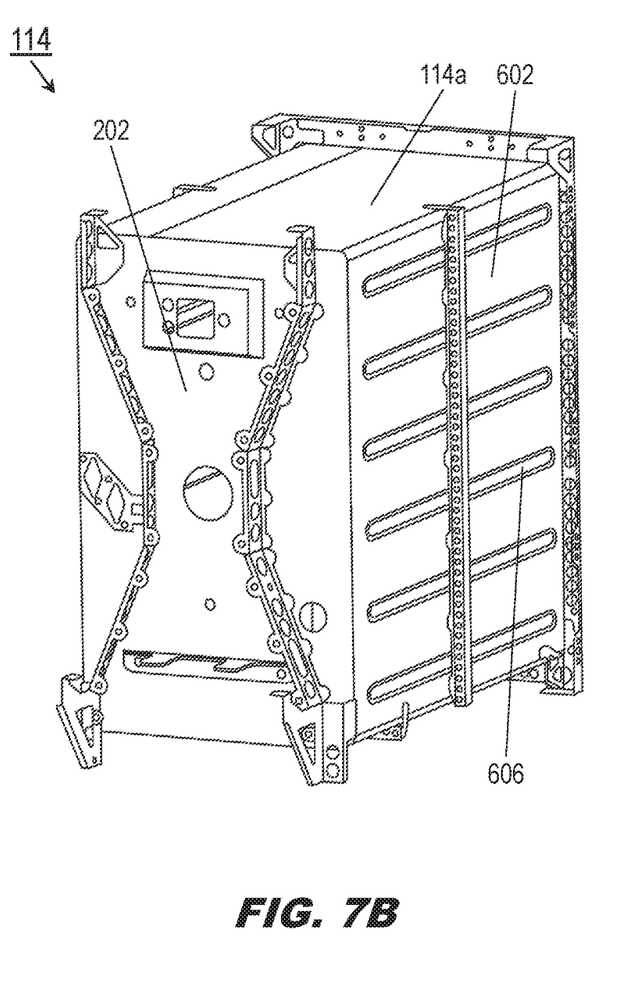

Referring to FIGS. 7A and 7B, the inner shell 114 is shown.

Referring now to FIGS. 4A-B and 6A, the baffle plate 206 may include an air intake vent 402. In embodiments, the air intake vent 402 may allow heated air (208, FIG. 2) circulating throughout the interior cavity 108 and into the meal carrier (110, FIG. 2) and individual trays (110a, FIG. 2) through the apertures (210, FIG. 2) to return to the heating element 112 for reheating and recirculation. The baffle plate 206 may be bolted (602) or otherwise fastened to the backplate 202 such that the heating element 112 is disposed between the backplate and the baffle plate.

Referring now to FIGS. 5A-B and 6A-B, the inner door plate 500 may be attached to the interior of the forward door 102 (or a comparable forward door of a GAIN chiller device), protecting the inner shell 114 (or, e.g., the inner shell (300, FIG. 3)) from the interior surface of the forward door and insulating the contents of the interior cavity 108. In embodiments, the inner door plate 500 may be fashioned of Grade 1 or Grade 2 titanium of comparable thickness to the inner shell 114, e.g., not less than 0.4 millimeters and not more than 0.8 millimeters.

In embodiments, referring in particular to FIGS. 6A-B and 7A-B, the left-side lateral surface 602 and right-side lateral surface 604 of the inner shell 114 may include a series of substantially horizontal indentations 606 in a vertical spaced apart relationship between the upper surface 116a and lower surface 610 of the inner oven shell, extending forward from the backplate 202. For example, the horizontal indentations 606 may provide additional stiffness and stability as well as guidance for heated air (208) to circulate between the left-side and right-side lateral surfaces 602, 604 and into the meal carrier (110, FIGS. 1-2). In some embodiments, the slats 606 may include vertical, diagonal, freeform, or otherwise shaped indentations in the exterior surfaces of the inner shell 114.

Referring now to FIGS. 8A and 8B, the aircraft GAIN device 800 may be implemented and may function similarly to the GAIN device 100 of FIGS. 1 through 7B, except that the GAIN device 800 may be a water heater/boiler device having a tank shell 802.

In embodiments, the tank shell 802 may have a substantially cylindrical shape (or any other appropriate shape capable of accommodation within the external housing 104. For example, the tank shell 802 may be fashioned of one or more sheets of Grade 1 or Grade 2 titanium having a thickness substantially between 1.0 and 1.8 millimeters inclusive. The GAIN device 800 may include one or more water inlets 804 plumbed to an aircraft water system and capable of filling and refilling the tank shell 802 with a volume of water, the heated water dispensed for coffee/tea brewing or directly from a faucet (not shown). The GAIN device 800 may include one or more heating elements 806 in communication with an aircraft power supply. For example, the heating elements 806 may extend at least partially into the interior cavity defined by the tank shell 802, heating the water enclosed therein to a desired temperature by direct conductive contact. The desired temperature (e.g., boiling, just under boiling, warm) may be adjustable via forward-mounted HMI 106a, based on control input submitted via the HMI by a cabin crewmember or other user.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An aircraft galley insert (GAIN) device, comprising:
    an exterior housing insertable in an aircraft galley structure;
    a forward door operable via an external handle;
    an inner shell disposed at least partially within the exterior housing, the inner shell fashioned of at least one of Grade 1 titanium and Grade 2 titanium having a thickness not less than 0.4 millimeters and not more than 0.8 millimeters, the inner shell comprising an interior cavity defined by a left-side lateral surface, a right-side lateral surface, an upper surface, and a lower surface, the interior cavity accessible via the forward door; and
    at least one backplate mountable to the inner shell opposite the forward door and having an interior surface and an exterior surface, the backplate fashioned of at least one of Grade 1 titanium and Grade 2 titanium having a thickness not less than 0.5 millimeters and not more than 1.2 millimeters.

2. The aircraft GAIN device of claim 1, wherein the backplate includes at least one GAIN interface connectible to an aircraft power supply.

3. The aircraft GAIN device of claim 1, further comprising:
    at least one inner door plate attached to an interior surface of the forward door, the inner door plate fashioned of at least one of Grade 1 titanium and Grade 2 titanium having a thickness not less than 0.4 millimeters and not more than 0.8 millimeters.

4. The aircraft GAIN device of claim 1, wherein the GAIN device is an oven further comprising:
    at least one heating element disposed within the interior cavity, the heating element configured to generate heat; and
    at least one fan configured to:
        draw a volume of air toward the heating element; and
        circulate the heated air throughout the interior cavity.

5. The aircraft GAIN device of claim 4, further comprising:
    at least one baffle plate mountable to at least one of the inner shell and the backplate, the baffle plate fashioned of at least one of Grade 1 titanium and Grade 2 titanium having a thickness not less than 0.5 millimeters and not more than 1.2 millimeters.

6. The aircraft GAIN device of claim 4, further comprising:
    at least one meal carrier disposed within the interior cavity, the meal carrier comprising a stacked plurality of trays disposed between a left-side wall and a right-side wall, the left-side wall and the right-side wall including a plurality of apertures capable of admitting the heated air into the stacked plurality of trays.

7. The aircraft GAIN device of claim 6, wherein at least one of the left-side lateral surface and the right-side lateral surface includes a series of substantially horizontal indentations capable of allowing the heated air to pass into the meal carrier.

8. The aircraft GAIN device of claim 1, wherein:
the GAIN device includes a chiller; and
at least one of the inner shell and the backplate includes at least one air intake configured to admit chilled air into the interior cavity.

9. The aircraft GAIN device of claim 1, further comprising:
at least one human-machine interface (HMI) mounted to the exterior housing, the HMI capable of receiving control input from a user; and
control circuitry disposed within the exterior housing and in communication with the at least one HMI, the control circuitry capable of controlling an internal temperature within the interior cavity based on the received control input.

10. The aircraft GAIN device of claim 1, wherein at least one of the inner shell and the backplate is fashioned of Grade 2 titanium.

11. The aircraft GAIN device of claim 1, wherein the exterior housing is one of:
a full-size galley insert (GAIN) housing having at least one of a standard width, a standard depth, and a standard height; and
a half-size GAIN housing having at least one of the standard width, the standard depth, and a reduced height substantially half of the standard height.

12. An aircraft galley insert (GAIN) device, comprising:
an exterior housing insertable in an aircraft galley structure;
at least one water tank assembly comprising:
an enclosed tank shell configured to hold a volume of water, the tank shell fashioned of one or more sheets of at least one of Grade 1 and Grade 2 titanium having a thickness not less than 1 millimeter and not more than 1.8 millimeters;
at least one inlet in communication with an aircraft water system, the inlet configured to fill the tank with the volume of water; and
at least one heating element extending at least partially into the tank shell, the heating element in communication with an aircraft power supply and configured to heat the volume of water.

13. The aircraft GAIN device of claim 1, further comprising:
at least one human-machine interface (HMI) mounted to the exterior housing, the HMI capable of receiving control input from a user; and
control circuitry disposed within the exterior housing and in communication with the at least one HMI, the control circuitry capable of directing the at least one heating element to heat the volume of water to a desired temperature based on the received control input.

* * * * *